(12) United States Patent
Nedorezov et al.

(10) Patent No.: US 9,358,968 B2
(45) Date of Patent: Jun. 7, 2016

(54) COLD TEMPERATURE ENGINE START

(71) Applicant: FORD GLOBAL TECHNOLOGIES, LLC, Dearborn, MI (US)

(72) Inventors: Felix Nedorezov, Rochester Hills, MI (US); Kenneth Jahr, West Bloomfield, MI (US); Steven Anatole Frait, Milan, MI (US); Hong Jiang, Birmingham, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 138 days.

(21) Appl. No.: 14/340,624

(22) Filed: Jul. 25, 2014

(65) Prior Publication Data

US 2016/0023646 A1    Jan. 28, 2016

(51) Int. Cl.
*B60W 10/02* (2006.01)
*B60W 10/08* (2006.01)
*B60W 10/26* (2006.01)

(52) U.S. Cl.
CPC .............. *B60W 10/02* (2013.01); *B60W 10/08* (2013.01); *B60W 10/26* (2013.01); *B60W 2510/06* (2013.01); *B60W 2510/081* (2013.01); *B60W 2550/12* (2013.01); *B60W 2710/02* (2013.01); *B60W 2710/06* (2013.01); *B60W 2710/081* (2013.01); *Y10S 903/93* (2013.01)

(58) Field of Classification Search
CPC ..... B60W 10/02; B60W 10/08; B60W 10/26; B60W 2550/12; B60W 2510/06; B60W 2510/081; B60W 2710/02; B60W 2710/081; B60W 2710/06; Y10S 903/93
USPC .......................................................... 701/22
See application file for complete search history.

(56) References Cited

U.S. PATENT DOCUMENTS

| 6,271,648 | B1 | 8/2001 | Miller |
| 8,209,970 | B2 | 7/2012 | Gonze et al. |
| 8,620,505 | B2 | 12/2013 | Sah et al. |
| 2013/0333655 | A1 | 12/2013 | Schwenke et al. |
| 2015/0321658 | A1* | 11/2015 | Hansson ................. B60K 6/48 701/22 |
| 2016/0023646 | A1* | 1/2016 | Nedorezov ............ B60W 10/02 701/22 |
| 2016/0032881 | A1* | 2/2016 | Ichikawa ................ F16H 29/04 74/7 R |

* cited by examiner

Primary Examiner — Richard Camby
(74) Attorney, Agent, or Firm — David B. Kelley; Brooks Kushman, P.C.

(57) ABSTRACT

A method of starting a vehicle may include providing power to a motor to spin the motor at a speed at least equal to a target engine cranking speed while a clutch configured to couple an engine and motor is open. The method may also include cutting power to the motor in response to the motor achieving the speed, and locking the clutch to couple the rotating inertias of the motor and a transmission with the engine to start the engine.

19 Claims, 3 Drawing Sheets

COLD TEMPERATURE ENGINE START

TECHNICAL FIELD

This patent application relates to a method of vehicle starting at cold temperatures.

BACKGROUND

Hybrid electric vehicles (HEV) may be provided with both an internal combustion engine and an electric machine in communication with a high voltage battery, capable of generating power and torque. The electric machine may start the engine by providing torque to crank the engine. Some HEV's may be provided with a low voltage starter to assist the electric machine in starting the engine at low temperatures.

SUMMARY

In at least one embodiment, a method of starting a vehicle is provided. The method may include providing power to a motor to spin the motor at a speed at least equal to a target engine cranking speed while a clutch configured to couple an engine and motor is open. The method may further include, in response to the motor achieving the speed, cutting power to the motor and locking the clutch to couple rotating inertias of the motor and a transmission with the engine to start the engine.

In at least one embodiment, a controller for a vehicle is provided. The controller may include input communication channels configured to receive an ambient temperature and an engine start request. The controller may further include output communication channels configured to provide a battery power command. The controller may further include control logic configured to, in response to the engine start request and the ambient temperature being less than a threshold, command that battery power be provided to an electric machine to spin the electric machine and a transmission element coupled therewith to a speed at least equal to a synchronous speed while a friction element configured to couple an engine to the electric machine is not applied.

In at least one embodiment, a vehicle is provided. The vehicle may include an electric machine coupled to a transmission element, an engine selectively coupled with the electric machine by a clutch, and a controller. The controller may be programmed to, in response to a request to start the engine and a temperature being less than a threshold, command that power be provided to the electric machine such that the electric machine achieves a speed at least equal to an engine cranking speed while the clutch is disengaged. The controller may be further programmed to, in response to the electric machine achieving the speed, cut power to the electric machine and lock the clutch to couple rotating inertias of the electric machine and transmission element with the engine to start the engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
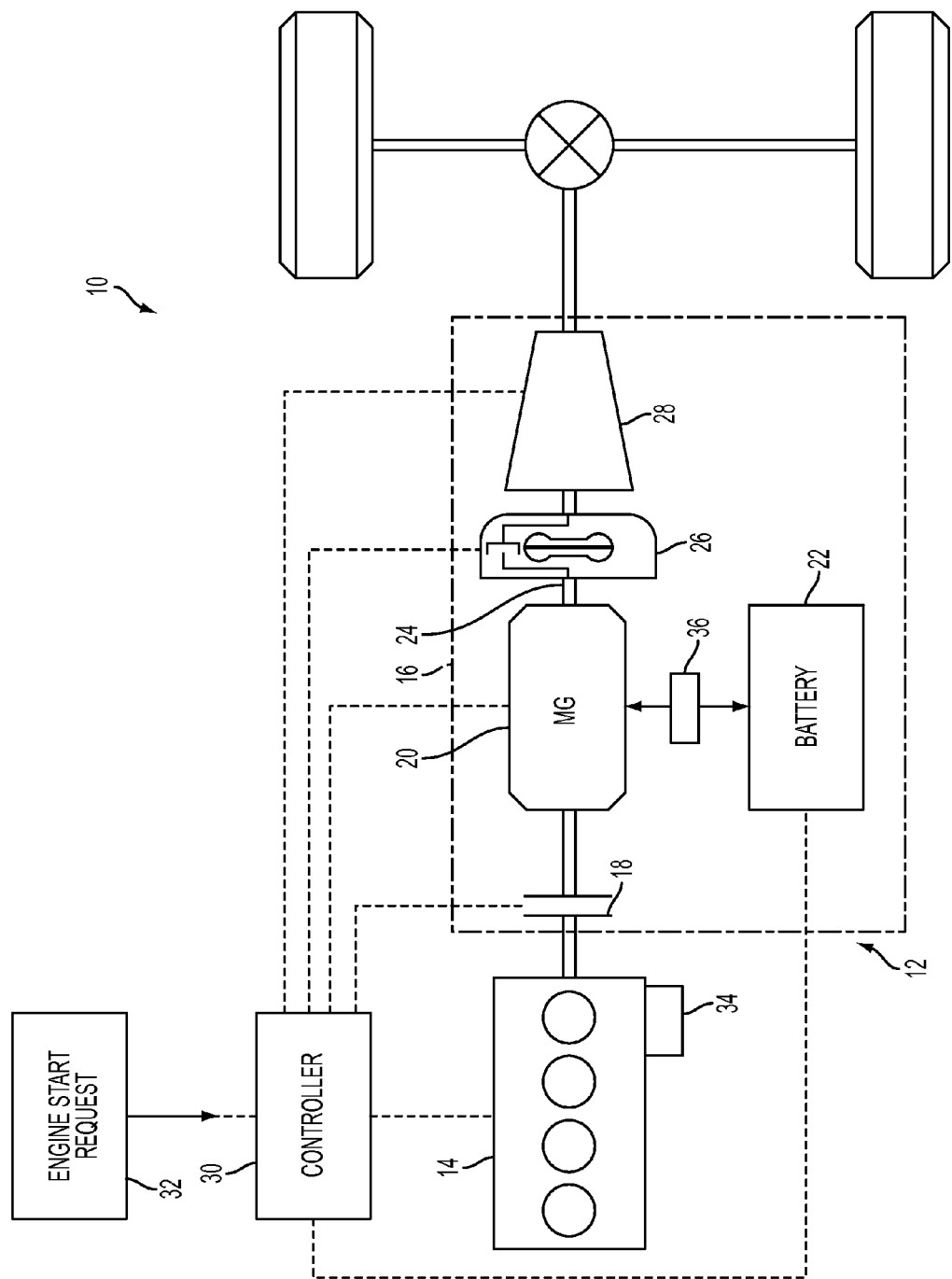
FIG. 1 is a schematic diagram of a hybrid electric vehicle.

Referring to FIG. 1, a schematic diagram of a Hybrid Electric Vehicle (HEV) 10 is illustrated according to an embodiment of the present disclosure. Physical placement and orientation of the components within the vehicle may vary. Although the powertrain of FIG. 1 will be particularly described, the strategies in accordance with embodiments of the present disclosure may apply to other powertrain configurations. The HEV 10 includes a powertrain 12 having an engine 14 that is operatively connected to a transmission 16. The transmission 16 may include a disconnect clutch 18, an electric machine such as an electric motor-generator 20, an associated traction battery 22, an input shaft 24, a launch clutch or torque converter 26, and a gear box 28.

The engine 14 may be selectively coupled to the motor-generator 20 via the disconnect clutch 18. The engine 14 and the motor-generator 20 may both act as drive sources for the HEV 10 by providing torque to the gearbox 28. The motor-generator 20 may be implemented by any one of a plurality of types of electric machines. For example, the motor-generator 20 may be a permanent magnet synchronous motor.

The transmission 16 may be configured as a step-ratio transmission using multiple friction elements for transmission gear ratio shifting. The transmission 16 may be configured to produce multiple forward and reverse gears via multiple gearing elements within the gear box 28. The motor generator 20 may be connected to the gear box 28 via a transmission input shaft 24 and subsequently to a transmission element such as an impeller, a launch clutch, or torque converter.

The controller 30 may be configured to operate the HEV 10 or powertrain 12 in a charge depletion mode in which the engine 14 may be isolated from the remainder of the powertrain 12, via the disconnect clutch 18, such that the motor-generator 20 may act as the sole drive source for the HEV 10 using the traction battery as its power source. The controller 30 may also be configured to operate the HEV 10 or powertrain 12 in a charge sustaining mode in which the engine 14 is operatively connected to the remainder of the powertrain 12, such that both the engine 14 and motor-generator 20 may act as drive sources for the HEV 10.

A controller 30 may be in communication with the engine 14, the powertrain 12, and an operator input 32. The operator input 32 may be an ignition switch, push button or the like, configured to provide an engine start request to the controller 30.

An engine start may be accomplished by controlling the disconnect clutch 18 which may couple the motor generator 20 to the engine 14 and transfer torque from the motor generator 20 to turn or crank the engine 14. The motor generator 20 may receive power from the traction battery 22 to spin the motor generator 20. As the power provided to the motor generator 20 is increased, the motor generator 20 speed may also increase and the disconnect clutch 18 may gradually couple the motor generator 20 with the engine 14 with increasing capacity. The coupling of the motor generator 20 with the engine 14 may result in the engine 14 rotating. Upon the engine 14 achieving a sufficient speed, the engine 14 may begin to be fueled and fired to accelerate to a synchronous speed at which point the disconnect clutch 18 may be fully engaged. The disconnect clutch 18 may be continuously engaged, with increasing torque capacity with the engine 14 during the entire engine start process.

Starting the engine 14 using the above mentioned process may require a large amount of traction battery power. For example, for the motor generator 20 to continuously apply 100 N-m to the engine 14 to reach the desired engine cranking speed at which they engine may be fired, it may be required the traction battery 22 provide at least 15 kW of power to the motor generator 20 during the starting process.

Figure 2:
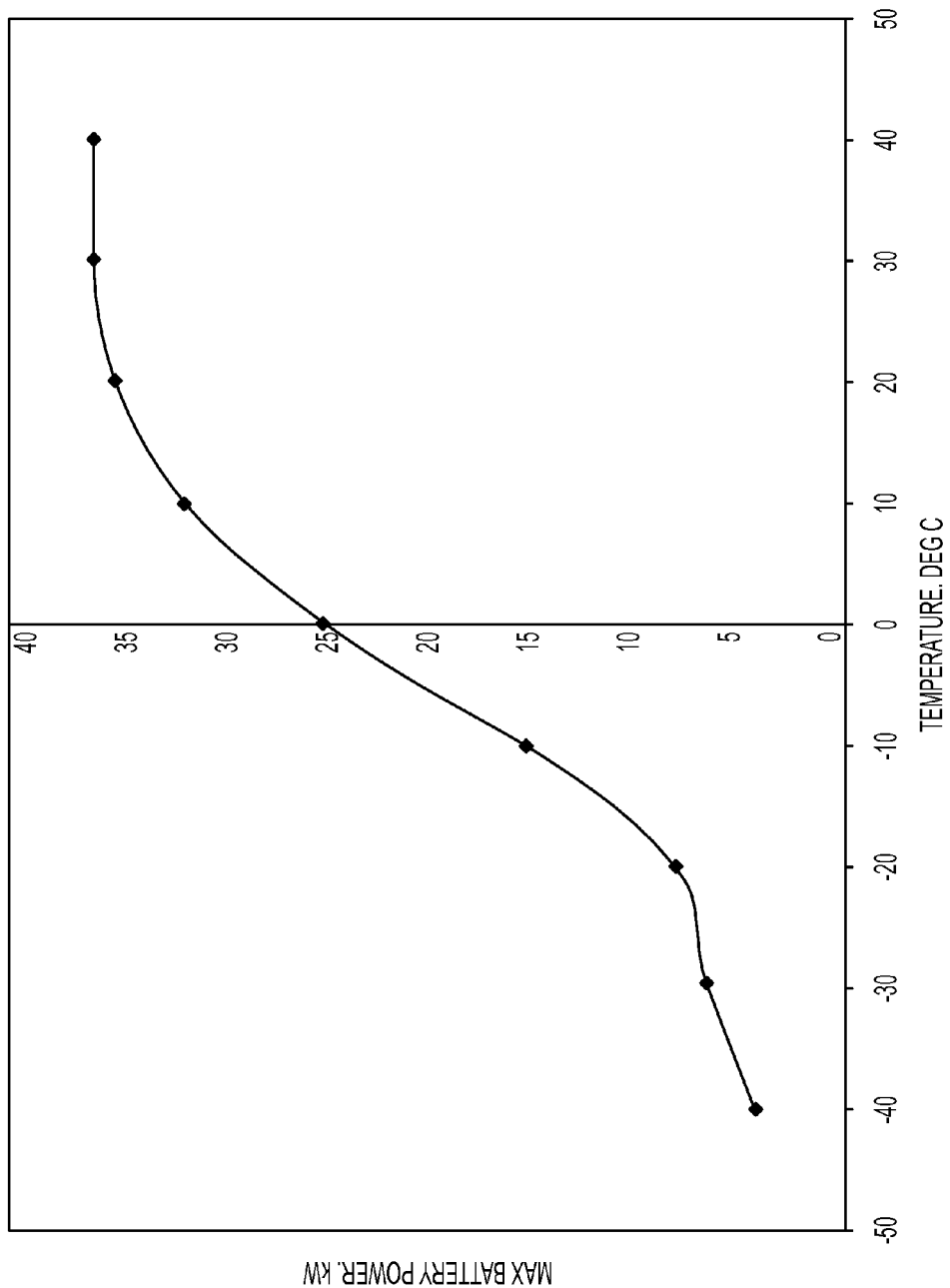
FIG. 2 is plot demonstrating the effect of ambient temperature on the maximum power that may be provided by the high voltage battery.

Engine starts at low temperatures may present challenges to the starting process due to restricted traction battery power at low temperatures. A low temperature start may occur after a cold soak in which the engine coolant or engine oil temperature is approximately the same as the ambient temperature. As shown in FIG. 2, as the ambient temperature decreases, the battery power available to spin the motor generator 20 to start the engine 14 may decrease. For example, at ambient temperatures less than −10 C, the traction battery 22 may be unable to provide the minimum amount of power to start the engine 14 using the motor generator 20 alone. In some HEV's, a low voltage starter 34 may be used to start the engine 14 at low temperatures.

At low temperatures, the low voltage starter 34 may rotate the engine 14 while the disconnect clutch 18 is open/not applied. The motor generator 20 may be spun to a speed sufficient to supply transmission hydraulic pressure to couple the motor generator 20 to the engine 14 by applying disconnect clutch 18. The motor generator 20 may then be coupled to the engine 14 and the combination of the motor generator 20 and the engine 14 may be spun to a synchronous speed. This scheme may require additional components including a low voltage battery and wiring sized for the cold cranking current provided by the low voltage battery. The implementation of a low voltage starter 34 may be more costly and may increase vehicle weight leading to decreased fuel economy.

In an effort to obviate the additional cost and weight associated with implementing the low voltage starter 34, the motor generator 20 and a transmission component such as the input shaft 24 and torque converter 26 may be utilized to crank the engine 14. The rotating inertias of the motor generator 20, input shaft 24, and the torque converter 26 may be applied to the engine 14 without placing an additional burden on traction battery 22.

The engine starting process may begin by the controller input communication channels receiving from the operator input 32 an engine start request and an ambient temperature. The controller 30 may compare the ambient temperature to a threshold ambient temperature. The threshold ambient temperature may be a temperature below which the traction battery 22 may be unable to provide sufficient traction battery power to start the engine 14 using the traditional starting method.

The transmission 28 may be commanded to a neutral state to minimize the load on the motor generator 20 and also to isolate the drive line during engine start. The neutral state may be park or true neutral in which a series of friction elements or clutches within the transmission 28 are open or not applied.

The minimized load may reduce the total amount of power requested from the traction battery 22 to achieve the desired motor generator speed. The minimized load may include the expected transmission pumping or friction losses and engine pumping and friction losses when the motor generator 20 is coupled to the engine 14. These losses may be determined by characterization testing at various ambient temperatures.

In response to the ambient temperature being less than a threshold ambient temperature, the controller 30 may, via output communication channels, command the traction battery 22 to provide a limited amount of power to the motor generator 20. As part of the control architecture and the transmission 16, a power inverter 36 may limit or control the power drawn from the traction battery 22 by the motor generator 20.

The controller 30 may also command the disconnect clutch 18 open or not applied, based on the powertrain configuration. The traction battery power provided to the motor generator 20 may cause the motor generator 20 and the transmission element to spin at a speed at least equal to a target engine cranking speed. The controller 30 may command an increasing amount of traction battery power up to the maximum battery power limit for a given temperature, to further increase the motor generator speed, if necessary.

The controller 30 may determine or calculate a target motor generator speed We based on the following formula:

$$Itr*(We-Wc)/tcr-Ttr=ItWc/tcr+Tengcr \qquad (1)$$

where Itr may represent the inertia of the transmission 16 when in Park or neutral. The inertia of the transmission 16 may include the partial inertia of the disconnect clutch 18, the inertia of the motor generator 20, the input shaft 24, and the torque converter 26 at a given rotational speed. We may represent the target rotational speed of the motor generator 20. Wc may represent the target engine cranking speed at which the engine 14 may start upon fueling. tcr may represent the expected engine cranking time. Ttr may represent transmission pumping, friction, and spinning losses. It may represent the engine inertia and the partial inertia of the disconnect clutch 18. Tengcr may represent engine pumping, friction, and spinning losses.

Equation (1) may be solved for We for a given Wc, tcr, Tengcr, and Ttr. Tengcr, tcr, and Ttr may be determined from characterization tests at various ambient temperatures. These values may be provided as part of a look-up table and in response to a given ambient temperature, the controller 30 may select the appropriate values of tcr, Tengcr, and Ttr. Wc and tcr may be provided as a target cranking speed and cranking time based on a given ambient temperature.

The expected engine cranking time, tcr, may represent an expected amount of time required to spin the engine 14 up to Wc. tcr may include the total amount of time required to spin the motor generator 20 up to the target rotational speed We, transfer the rotational inertia of the motor generator 20 and the transmission element to the engine 14 to spin the engine 14 at Wc, and subsequently start the engine 14.

The expected engine cranking time, tcr, at higher ambient temperatures may be lower than the expected engine cranking time at lower ambient temperatures. These variations in engine cranking time may be due to the increased viscosity of the engine oil and transmission oil at lower ambient temperatures that may increase the losses represented by Tengcr and Ttr, respectively. The variation in engine cranking time may also be due to the decreased viscosity of the engine oil and transmission oil at higher ambient temperatures that may decrease the losses represented by Tengcr and Ttr, respectively.

Upon the motor generator 20 achieving the target rotational speed We, the controller 30 may command a reduction or limit the traction battery power delivered to the motor generator 20. The disconnect clutch 18 may be applied to the engine 14 via an input, with full torque capacity, to couple or transfer the rotational inertias of the motor generator 20 and the transmission element, at We, to the engine 14. The transfer of the rotational inertias of the motor generator 20 and the transmission element to the engine 14 may spin the engine 14 up to Wc or a synchronous speed.

The synchronous speed may be the operational point at which both sides of the disconnect clutch 18 are rotating at the same speed. This may present a no slip condition between the engine input and the motor generator 20.

The controller 30 may continue to monitor the rotational speed of the engine 14 or the position of the engine 14. The controller 30 may be in communication with a crank position sensor, a cam position sensor, an electric machine resolver, or an engine speed sensor to determine the amount of the revolutions made by the engine 14 at Wc. In response to the engine 14 rotating through a threshold number of revolutions, for example two or four revolutions, the controller 30 may command an engine start by requesting fuel be provided to the engine 14 to initiate combustion.

Figure 3:
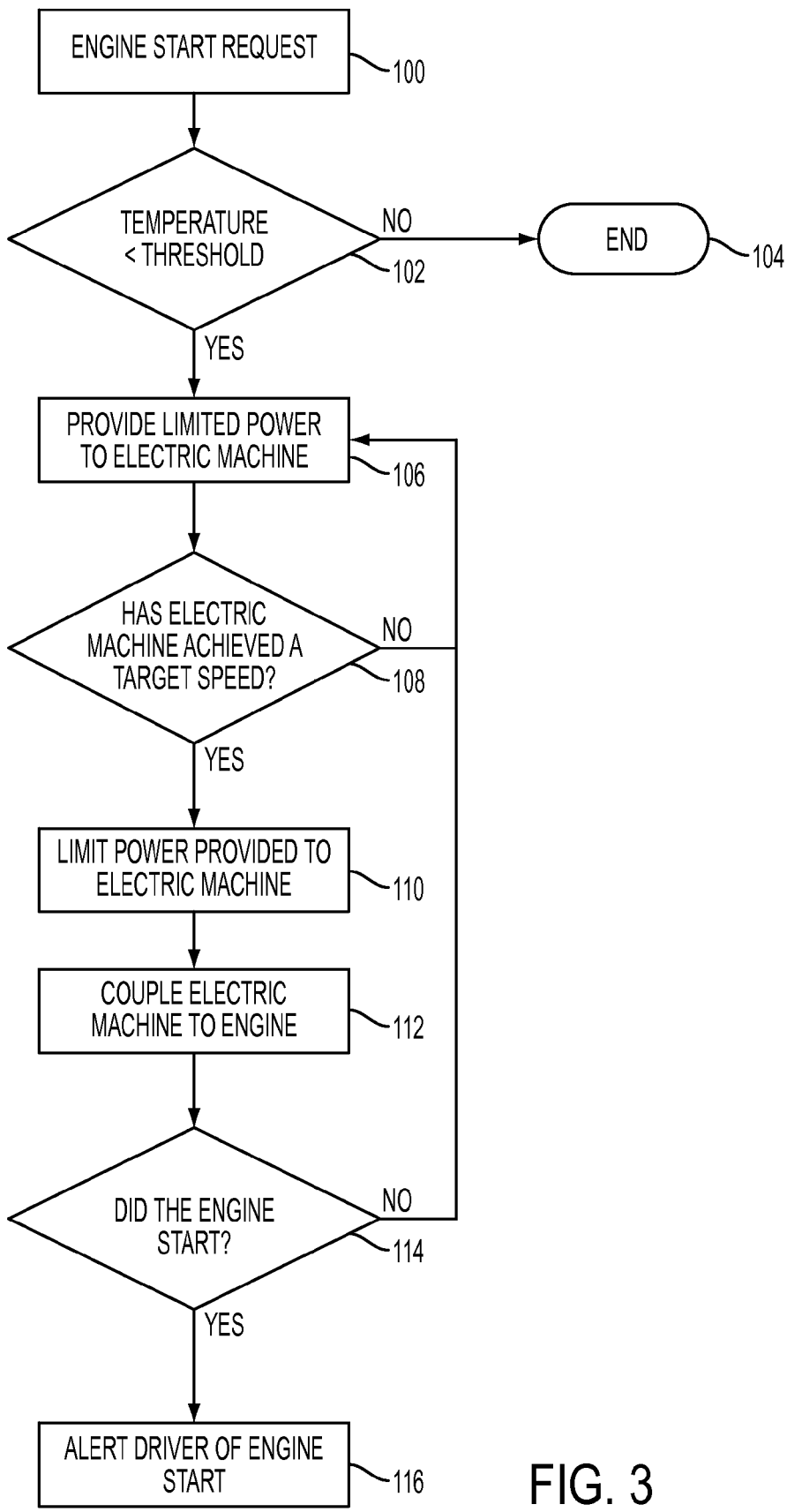
FIG. 3 is a flow chart of an algorithm for starting a vehicle.

Referring to FIG. 3, a flowchart of an exemplary method of starting the HEV 10 is shown. The method may be executed by the controller 30 and may be implemented as a closed loop control system. For brevity, the method will be described in the context of a single method iteration below.

The control logic may monitor and receive an engine start request, an engine rotational speed, a generator rotational speed, ambient temperature, engine oil or coolant temperature, and an engine start request. At block 100, the method may receive an engine start request via the operator input 32. Upon receiving an engine start request, the method may continue to block 102.

At block 102, the method may compare the received ambient temperature to a threshold ambient temperature. If the ambient temperature is greater than the threshold ambient temperature the method may end at block 104. At block 104, the engine 14 may be started using an alternative starting method not involving limited traction battery power.

In response to the ambient temperature less than the threshold ambient temperature, the method may prepare to start the engine 14 using the cold temperature strategy. At block 106, the method may command the power inverter 36 to limit the power drawn from the traction battery 22 by the motor generator 20 based at least in part on the measured ambient temperature. The power provided to the motor generator 20 may cause the motor generator 20 to spin at a speed. The method may continue to block 108.

At block 108, the method may compare the rotational speed of the motor generator 20 to a target motor generator rotational speed We. If the rotational speed of the motor generator is less than the target motor generator rotational speed, the method may return to block 106. Upon returning to block 106, the method may command that additional power be provided by the traction battery 22 up to the battery power limit, at the measured ambient temperature. If the rotational speed of the motor generator 20, measured at block 108, is equal to or greater than the target motor generator rotational speed, the method may continue to block 110.

At block 110, the method may command a reduction or further limit the power provided to the motor generator 20 using the power inverter 36. The power provided by the traction battery 22 to the motor generator 20 may be limited to an allowed minimum amount of traction battery power to reduce or eliminate any burden on the traction battery 22 related to starting the engine 14. Upon limiting the power provided to the motor generator 20, the method may continue to block 112.

At block 112, the method may command the disconnect clutch 18 be applied or locked to couple the motor generator 20 with the engine 14. Applying or locking the disconnect clutch 18 may comprise applying the disconnect clutch 18 with full capacity or maximum torque capacity. The disconnect clutch 18 may be coupled to the engine 14 to provide a nearly instantaneous transfer of the rotational inertias or torque of the motor generator 20 and the transmission element to the engine 14. This transfer may increase the engine rotational speed to at least Wc. The method may continue to block 114.

At block 114, the method may determine if the engine is capable of starting or has started. The method may monitor the number of revolutions made by the engine 14 at a given engine rotational speed such as We or the synchronous speed. If the engine was unable to start, either due to the engine not rotating through at least two revolutions at We or the synchronous speed, the method may return to block 106 and increase the motor generator rotational speed. If the engine rotates through at least two revolutions at Wc, fuel may be provided to the engine 14 and the engine started and method may continue to block 116.

At block 116, the method may provide an alert to the driver indicating that the engine has started. The alert may be an auditory, haptic, visual, or other alert configured to alert the driver that the vehicle is ready to be operated in a hybrid electric mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of starting a vehicle comprising:
providing power to a motor to spin the motor at a speed at least equal to a target engine cranking speed while a clutch configured to couple an engine and the motor is open,
cutting power to the motor in response to the motor achieving the speed, and
locking the clutch to couple rotating inertias of the motor and a transmission with the engine to start the engine.

2. The method of claim 1 wherein the power provided to the motor is limited in response to a temperature being less than a threshold.

3. The method of claim 1 wherein the speed is based on the target engine cranking speed and a target cranking time.

4. The method of claim 1 wherein locking the clutch comprises applying the clutch with full torque capacity to the engine.

5. The method of claim 1 wherein the transmission is in a neutral state.

6. The method of claim 1 further comprising, in response to the engine rotating at least two revolutions, outputting for display an alert to a driver indicative of an engine start.

7. The method of claim 3 wherein the target cranking time is based on a temperature.

8. A controller for a vehicle comprising:
input communication channels configured to receive an ambient temperature and an engine start request;
output communication channels configured to provide a battery power command; and
control logic configured to
in response to the engine start request and the ambient temperature being less than a threshold, command that a battery power be provided to an electric machine to spin the electric machine and a transmission element coupled therewith to a speed at least equal to a synchronous speed while a friction element configured to couple an engine to the electric machine is not applied, and in response to the speed becoming at least equal to the synchronous speed, command a reduction in the battery power, and command an application of the friction element, with full capacity, to couple the engine to the electric machine.

9. The controller of claim 8 wherein the battery power is limited based on the ambient temperature.

10. The controller of claim 8 wherein the synchronous speed is based on a cranking time and friction losses.

11. The controller of claim 8 wherein the engine is spun to at least the synchronous speed using a rotational inertia of the electric machine.

12. The controller of claim 8 wherein the control logic is further configured to command an engine start in response to the engine rotating at least two revolutions at the synchronous speed.

13. A vehicle comprising:
an electric machine coupled to a transmission element;
an engine selectively coupled with the electric machine by a clutch; and
a controller programmed to, in response to a request to start the engine and a temperature being less than a threshold, command that power be provided to the electric machine such that the electric machine achieves a speed at least equal to an engine cranking speed while the clutch is disengaged, and in response to the electric machine achieving the speed, cut power to the electric machine, and lock the clutch to couple rotating inertias of the electric machine and transmission element with the engine to start the engine.

14. The vehicle of claim 13, wherein the controller is further programmed to, in response to the engine rotating through at least two revolutions, command an engine start.

15. The vehicle of claim 13, wherein the speed is based on the temperature and the rotating inertias of the electric machine and transmission element.

16. The vehicle of claim 13, wherein the speed is based on friction losses and the engine cranking speed.

17. The vehicle of claim 13, wherein the engine cranking speed is based on ambient temperature and a cranking time.

18. The vehicle of claim 13, wherein the power provided to the electric machine is restricted based on ambient temperature.

19. The vehicle of claim 14, wherein the controller is further programmed to alert a driver about an engine start.

* * * * *